(12) United States Patent
Ito

(10) Patent No.: US 7,697,231 B2
(45) Date of Patent: Apr. 13, 2010

(54) PORTABLE ELECTRONIC APPARATUS

(75) Inventor: Goro Ito, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1171 days.

(21) Appl. No.: 11/288,731

(22) Filed: Nov. 28, 2005

(65) Prior Publication Data

US 2006/0116165 A1 Jun. 1, 2006

(30) Foreign Application Priority Data

Nov. 30, 2004 (JP) ............ P2004-345930

(51) Int. Cl.
*G11B 21/02* (2006.01)
*G11B 15/04* (2006.01)

(52) U.S. Cl. .................. 360/75; 360/69
(58) Field of Classification Search ............ None
See application file for complete search history.

(56) References Cited

U.S. PATENT DOCUMENTS 5,809,520 A * 9/1998 Edwards et al. ............ 711/115
6,035,429 A * 3/2000 Shafe' ..................... 714/718
6,633,445 B1* 10/2003 Wilke ...................... 360/55
6,754,029 B2* 6/2004 Ito ........................... 360/75
7,336,437 B2* 2/2008 Cho ......................... 360/75

FOREIGN PATENT DOCUMENTS

JP 09-065268 3/1997
JP 3064207 9/1999

* cited by examiner

*Primary Examiner*—K. Wong
(74) *Attorney, Agent, or Firm*—Hogan & Hartson LLP

(57) ABSTRACT

A portable electronic apparatus includes: a non-contact type integrated circuit module; a magnetic recording device including: a magnetic recording medium; and a magnetic head that is adapted to be moved from a predetermined retract position to the magnetic recording medium for writing or reading of information; a magnetic detection unit that detects a magnetic force; and a control device that is adapted to make the magnetic head retract from the magnetic recording medium to the retract position when the magnetic head is positioned above the magnetic recording medium in response to the magnetic detection unit detecting the magnetic force.

14 Claims, 9 Drawing Sheets

PORTABLE ELECTRONIC APPARATUS

BACKGROUND OF THE INVENTION

The present invention relates to a portable electronic apparatus that includes a magnetic recording device, such as a hard disk drive (HDD) apparatus, and a non-contact type integrated circuit (IC) module, e.g., a portable telephone, a personal digital assistant (PDA), a music player, a digital camera, and a digital video camera.

Priority is claimed on Japanese Patent Application No. 2004-345930, filed Nov. 30, 2004, the content of which is incorporated herein by reference.

DESCRIPTION OF RELATED ART

In recent years, some portable electronic apparatuses, such as a portable telephone, a personal digital assistant (PDA), a music player, a digital camera, a digital video camera, and the like, include a non-contact type IC module having a wireless communication capability (For example, see Japanese Registered Utility Model No. 3064207). Such a non-contact type IC module is used as an alternative to, for example, a railway ticket, a train pass (season ticket) that allows a passenger to travel within a certain time frame on a certain line or lines, electronic money, a prepaid card, an identification card, and the like. For example, when an automated checking and fare adjustment for a train is performed when a user places his or her portable telephone having a non-contact type IC module near a data transmission and reception unit (external device), which writes and reads data, of an automated ticket checking and fare adjustment gate in a train station, transmission and reception of data are carried out via wireless communication. Alternatively, a portable telephone having a non-contact type IC module can engage in wireless communication with a data transmission and reception unit installed in a store, and a user can make payments for items that the user buys using the portable telephone.

Such a non-contact type IC module can engage in wireless communication with the above type of data transmission and reception unit by means of electromagnetic induction. Since the wireless communication between the non-contact type IC module and the data transmission and reception unit can take place only over a very short distance, the portable electronic apparatus having the non-contact type IC module is generally placed in contact with the data transmission and reception unit so that the wireless communication is reliably achieved.

On the other hand, types of data handled by a portable electronic apparatus include sound, graphics, and textual information, and in recent years, more memory space has been required for accommodating sounds and graphics of higher quality. In particular, small-sized HDDs have recently been developed, and such small HDDs can be installed within a portable electronic apparatus (for example, see Japanese Unexamined Patent Application, First Publication No. H09-65268). Such an HDD records and retrieves data to and from a magnetic disk using a magnetic head that is floated just above the magnetic disk by a very short distance, and very precise mechanisms are employed for the head mechanisms and the like for reading and writing data.

A portable electronic apparatus having a non-contact type IC module and an HDD installed therein will possibly become available in the near future.

However, in a portable electronic apparatus having a non-contact type IC module and an HDD installed therein, if wireless communication is performed between the non-contact type IC module and a data transmission and reception unit while information is read from or written onto the HDD, the portable electronic apparatus is forced to come in contact with the data transmission and reception unit and this impact may cause certain problems, such as the occurrence of an HDD head crash. As a result, a misoperation of reading or writing of data may occur, or data may be damaged. Furthermore, a magnetic force used to generate electric power for an antenna coil by means of the electromagnetic induction may adversely affect the HDD on which a writing or reading operation is executed.

SUMMARY OF THE INVENTION

The present invention was conceived in view of the above-described backgrounds, and an object thereof is to provide a portable electronic apparatus in which an internal HDD is protected from damage.

One aspect of the present invention is a portable electronic apparatus according to the present invention includes a non-contact type integrated circuit module; a magnetic recording device including: a magnetic recording medium; and a magnetic head that is adapted to be moved from a predetermined retract position to the magnetic recording medium for writing or reading of information; a magnetic detection unit that detects a magnetic force; and a control device that is adapted to make the magnetic head retract from the magnetic recording medium to the retract position when the magnetic head is positioned above the magnetic recording medium in response to the magnetic detection unit detecting the magnetic force.

Furthermore, in the portable electronic apparatus according to the present invention, the magnetic force may be generated by an external device that engages in wireless communication with the non-contact type integrated circuit module.

Furthermore, in the portable electronic apparatus according to the present invention, a notification device may be provided, and the control device may be adapted to make the notification device provide notification in response to the magnetic detection unit detecting the magnetic force.

Furthermore, in the portable electronic apparatus according to the present invention, a display unit may be provided, and the control device may be adapted to make the display unit notify of a suspension or prohibition of the writing or reading of information by the magnetic recording device in response to the magnetic detection unit detecting the magnetic force.

Furthermore, in the portable electronic apparatus according to the present invention, when the magnetic head is retracted by the control device during the writing or reading of information by the magnetic recording device and when the magnetic detection unit no longer detects the magnetic force, the control unit may be adapted to restart the write or read of the information by the magnetic recording device.

Furthermore, in the portable electronic apparatus according to the present invention, the control device may be adapted to prohibit the writing or reading of information by the magnetic recording device after the magnetic head is retracted to the retract position.

Furthermore, in the portable electronic apparatus according to the present invention, an operation key that functions as a switch to restore the magnetic recording device to an operating state may be provided, and the control device may be adapted to determine whether or not the magnetic head of the magnetic recording device is in the retract position in response to an operation of the operation key, and to cancel the prohibition of the writing or reading of information by the magnetic recording device when the magnetic head is in the retract position.

Another aspect of the present invention is a portable electronic apparatus, including: a non-contact type integrated circuit module; a magnetic recording device including: a magnetic recording medium; and a magnetic head that is adapted to be moved from a predetermined retract position to the magnetic recording medium for writing or reading of information; a magnetic detection unit that detects a magnetic force; and a control device that is adapted to determine whether or not the magnetic head of the magnetic recording device is in the retract position in response to the magnetic detection unit detecting the magnetic force, and prohibit the writing or reading of information by the magnetic recording device when the magnetic head is in the retract position.

Furthermore, in the portable electronic apparatus according to the present invention, the control device may be adapted to determine whether or not the magnetic head of the magnetic recording device is in the retract position in response to the magnetic detection unit detecting the magnetic force, retract the magnetic head of the magnetic recording device to the retract position when the magnetic head is not in the retract position, and prohibit the writing or reading of information by the magnetic recording device after the retraction of the magnetic head to the retract position completes.

Furthermore, in the portable electronic apparatus according to the present invention, a notification device may be provided, and the control device may be adapted to make the notification device provide notification in response to the magnetic detection unit detecting the magnetic force Furthermore, in the portable electronic apparatus according to the present invention, a display unit may be provided, and the control device is adapted to make the display unit notify of a prohibition of the writing or reading of information by the magnetic recording device in response to the magnetic detection unit detecting the magnetic force.

Furthermore, in the portable electronic apparatus according to the present invention, an operation key that functions as a switch to restore the magnetic recording device to an operating state may be provide, and the control device may be adapted to determine whether or not the magnetic head of the magnetic recording device is in the retract position in response to depression of the operation key, and cancel the prohibition of the writing or reading of information by the magnetic recording device when the magnetic head is in the retract position.

According to the present invention, when the magnetic detection unit detects a magnetic force, writing or reading of information by the magnetic recording device is suspended or prohibited. Thus, when the portable electronic apparatus makes contact with the external device for ensuring that wireless communication between the non-contact type IC module and the external device is established, a head crash or misoperation of the magnetic recording device caused by the impact of the forced contact can be prevented. Furthermore, erroneous writing or reading of information caused by the magnetic force can be prevented.

DETAILED DESCRIPTION OF THE INVENTION

Figure 1:
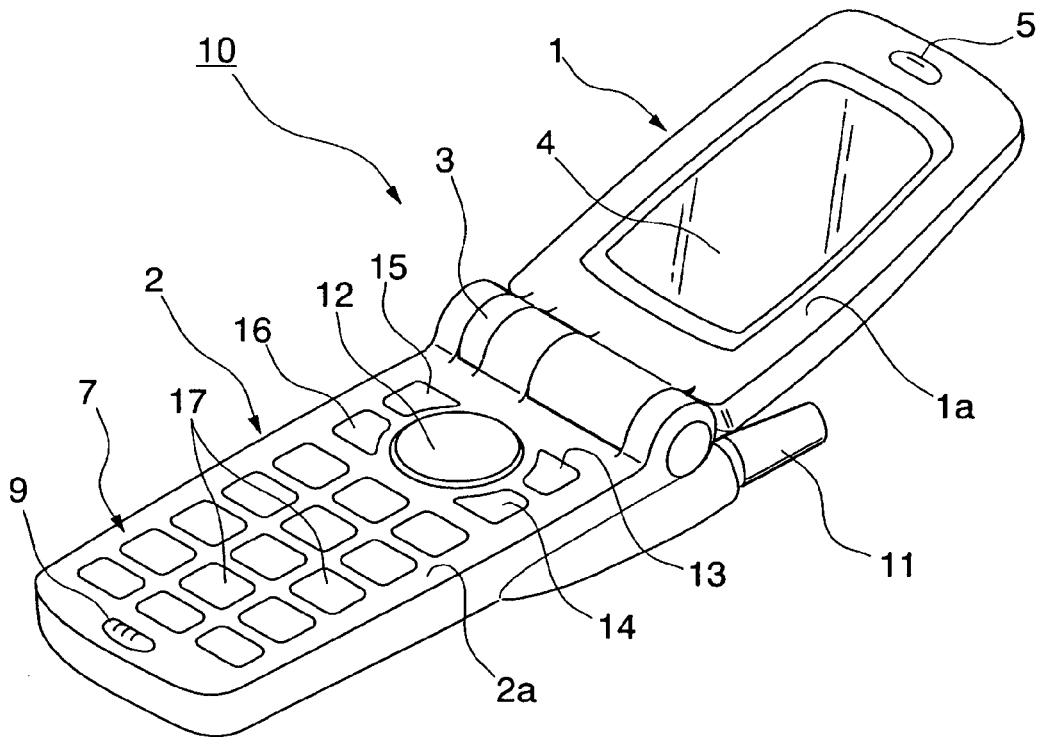
FIG. 1 is perspective view of a portable telephone according to a first embodiment of the present invention when it is opened and viewed from the front side.
Figure 2:
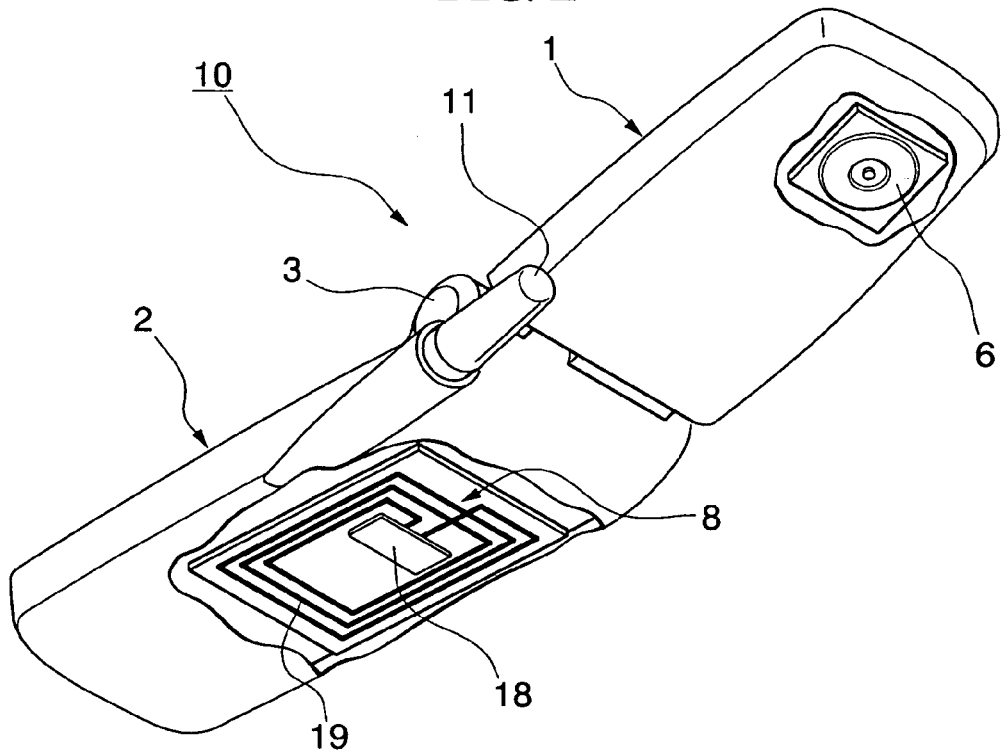
FIG. 2 is a partial broken perspective view of the portable telephone shown in FIG. 1 when viewed from the rear side.

FIGS. 1 to 6 illustrate a first embodiment of the present invention, and in embodiments described below, the present invention is applied to a portable telephone. With reference to FIGS. 1 and 2, a portable telephone (portable electronic apparatus) 10 according to this embodiment includes a first body 1 and a second body 2. These two bodies 1 and 2 are foldably connected to each other via a hinge portion 3 so that they can be opened and closed.

On a face 1a of the first body 1 that faces the second body 2 when the portable telephone is folded, a display unit 4 and a speaker unit 5 are provided, and an HDD unit (magnetic recording device) 6 is enclosed inside the first body 1. On another face 2a of the second body 2 that faces the first body 1 when the portable telephone is folded, a key operation unit 7 and a microphone 9 are provided, and a non-contact type IC module 8 is enclosed inside the second body 2. Furthermore, a retractable antenna 11 for communicating with a base station is provided in the vicinity of the hinge portion 3 of the second body 2.

In the key operation unit 7, a cross-bar key, a multi-functional operation key 12 including a set key, an operation key 13 relating to operation guidance, an operation key 14 for handling emails, an operation key 15 for web browsing, an operation key 16 for operating a telephone list, and operation keys 17 including numerical keys, an asterisk sign (*) key, a pound sign (#) key, and the like are provided.

The non-contact type IC module 8 includes an IC chip 18 and an antenna coil 19 connected thereto, and is arranged behind a battery cover (not shown) that constitutes the outer surface of the portable telephone 10 at the rear of the face opposite to the face 2a of the second body 2, for example.

Figure 3:
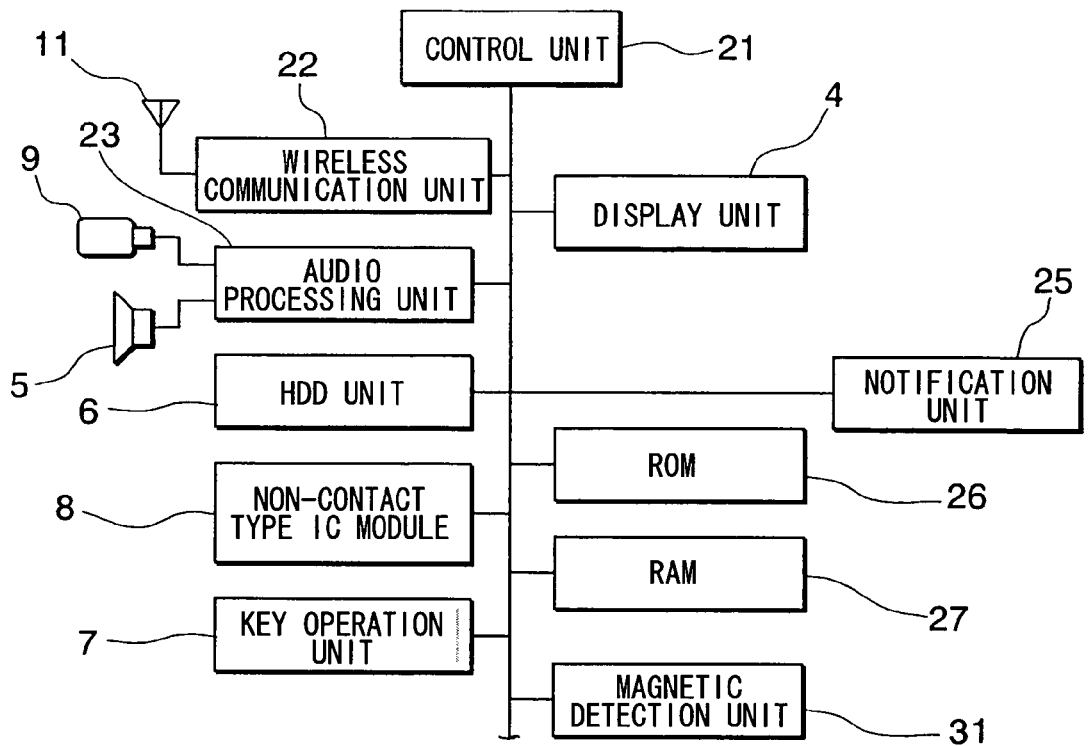
FIG. 3 is a block diagram illustrating a circuit configuration of a portable telephone terminal according to a first embodiment of the present invention.

Furthermore, this portable telephone 10 includes components other than those described above, including a control unit (control device) 21 such as a central processing unit (CPU), a wireless communication unit 22 connected to the antenna 11, an audio processing unit 23, a notification unit 25, a ROM 26 for storing various programs, a RAM 27 used as a working area for executing operations, and a magnetic detection unit 31, as shown in FIG. 3.

The control unit 21 controls the entire operation of the portable telephone 10, and the wireless communication unit 22 handles calls and data communication carried out via the antenna 11. The audio processing unit 23 processes voice signals received by the wireless communication unit 22 and sends the processed signals to the speaker unit 5. The audio processing unit 23 also processes sounds collected by the microphone unit 9 and sends the processed sounds to the wireless communication unit 22. The notification unit 25 constitutes a notification device that notifies a user of alarm information or the like with a sounded notification generated by the speaker unit 5 or the like, and vibration notification or the like generated by a vibrator (not shown), which will be described later.

It should be noted that the above-described display unit 4 and speaker unit 5 function as notification devices that visually or audibly notify a user of alarm information or the like.

Figure 4:
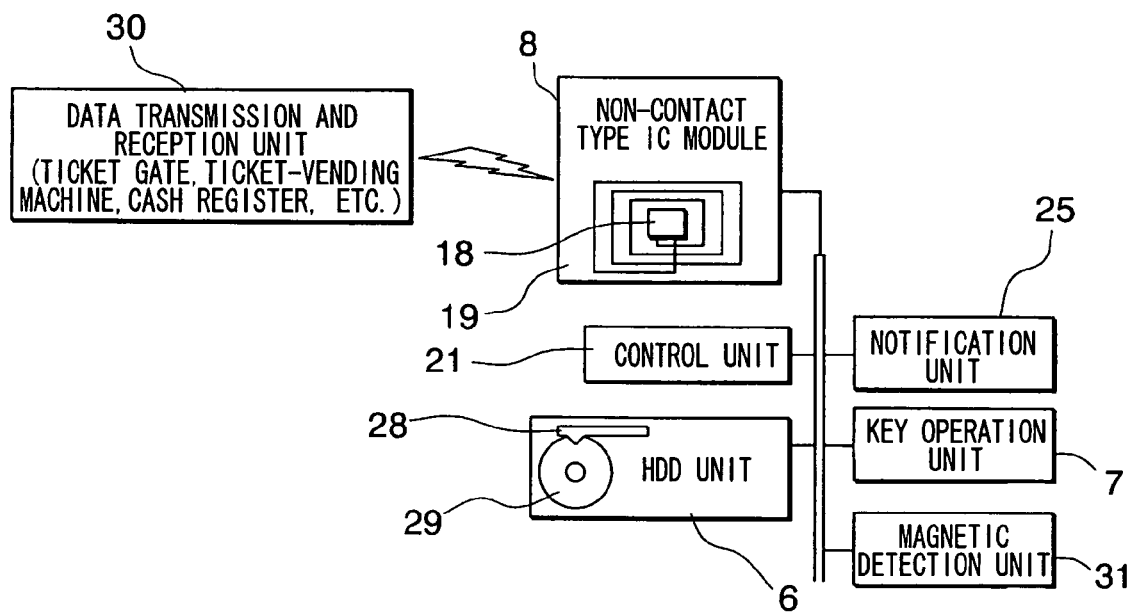
FIG. 4 is a block diagram illustrating the principal circuit configuration of a portable telephone terminal according to the first embodiment of the present invention.

As shown in FIG. 4, the HDD unit 6 includes a magnetic head 28 and a magnetic disk (magnetic recording medium) 29 used for reading or writing operations, and is configured to read or write predetermined data, such as image data, audio data, or the like, from or to the magnetic disk 29. Furthermore, the HDD unit 6 includes a motor for rotating the magnetic disk 29, another motor for moving the magnetic head 28, a control circuit for performing various controls, such as rotations of each of the motors or transfer of data from and to the magnetic disk 29, and a buffer memory. For simplicity of illustration, such components are not shown in the figures.

It should be noted that the magnetic head 28 is in a predetermined retract position when it is halted, and upon reading or writing, the magnetic head 28 is moved from the retract position to a controlled writing or reading position on the magnetic disk 29 for performing reading or writing. Upon completion of writing or reading, the magnetic head 28 moves away from the magnetic disk 29 and retracts to its original position. In addition, the magnetic head 28 returns to the retract position in response to an instruction from the control unit 21 during writing or reading.

The non-contact type IC module 8 performs wireless communication with a data transmission and reception unit (external device) 30 that is provided in an automated ticket checking and fare adjustment gate, a ticket-vending machine, a cash register, or the like.

The magnetic detection unit 31 includes a magnetic sensor, such as a hole IC element, or a magnetoresistive element, or the like, and is especially configured to detect a magnetic force coming from outside the portable telephone 10 and not to detect a magnetic force generated within the HDD unit 6. It should be noted that the control unit 21 is configured to make the magnetic head 28 move away from the magnetic disk 29 and return to the retract position when the magnetic detection unit 31 detects a magnetic force.

An example of the operation of the portable telephone 10 having the above configuration when used with an automated ticket checking and fare adjustment gate will be explained with reference to FIG. 5. It should be noted that the portable telephone 10 is folded so that the first body 1 and the second body 2 are folded together.

Figure 5:
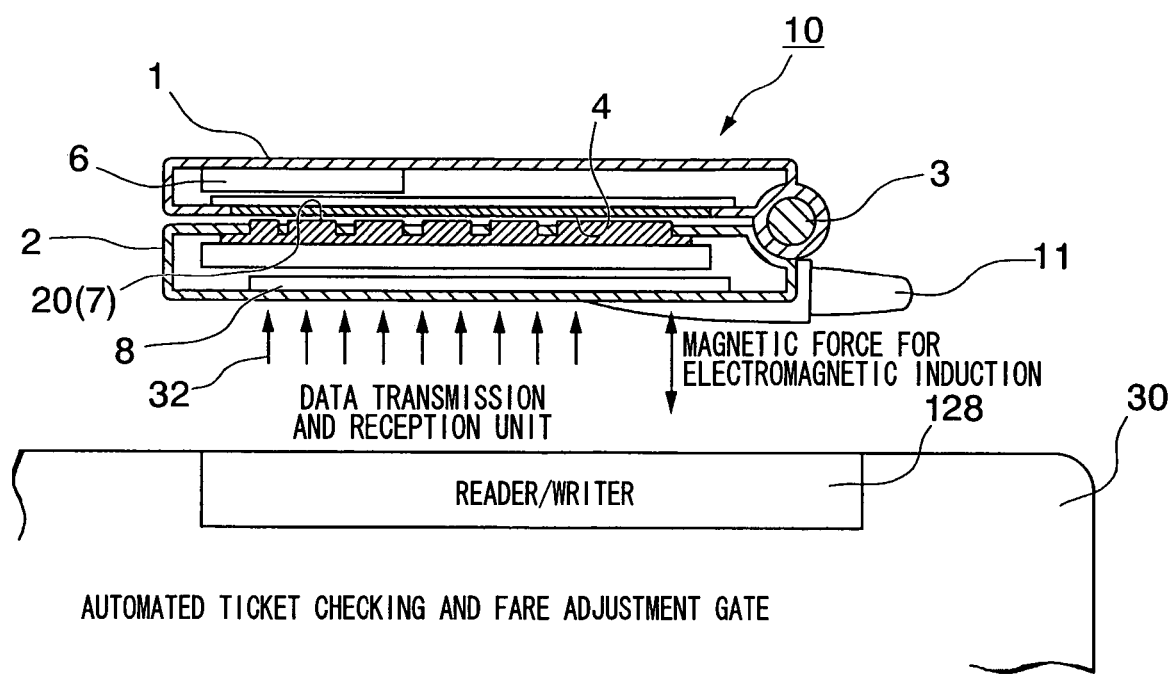
FIG. 5 is a schematic side view illustrating operations of the portable telephone according to the first embodiment of the present invention when used for automated ticket checking and fare adjustment.

As shown in FIG. 5, the first body 1 and the second body 2 are folded forward each other, and the display unit 4 and the key operation unit 7 are facing each other in close proximity. A user who owns this portable telephone 10 passes through an automated ticket checking and fare adjustment gate while holding the portable telephone 10 above or on the reader and writer 128 of the data transmission and reception unit 30 so that the non-contact type IC module 8 of the second body 2 faces downward. At this time, predetermined data is exchanged between the non-contact type IC module 8 and the data transmission and reception unit 30, and an automated ticket checking and fare adjustment operation is executed. While the exchange of data is performed, as described previously, the user tends to press the portable telephone 10 hard against the reader and writer unit 128.

Here, the antenna coil 19 of the non-contact type IC module 8 generates electricity from a magnetic force (magnetic force) 32 emitted by the data transmission and reception unit 30 by means of electromagnetic induction, and provides the generated electric power to the IC chip and operates as an antenna for wireless communication with the data transmission and reception unit 30. It should be noted that although this embodiment is explained using the case in which the first body 1 and the second body 2 are folded together as an example, the portable telephone 10 may be opened as shown in FIGS. 1 and 2.

Figure 6:
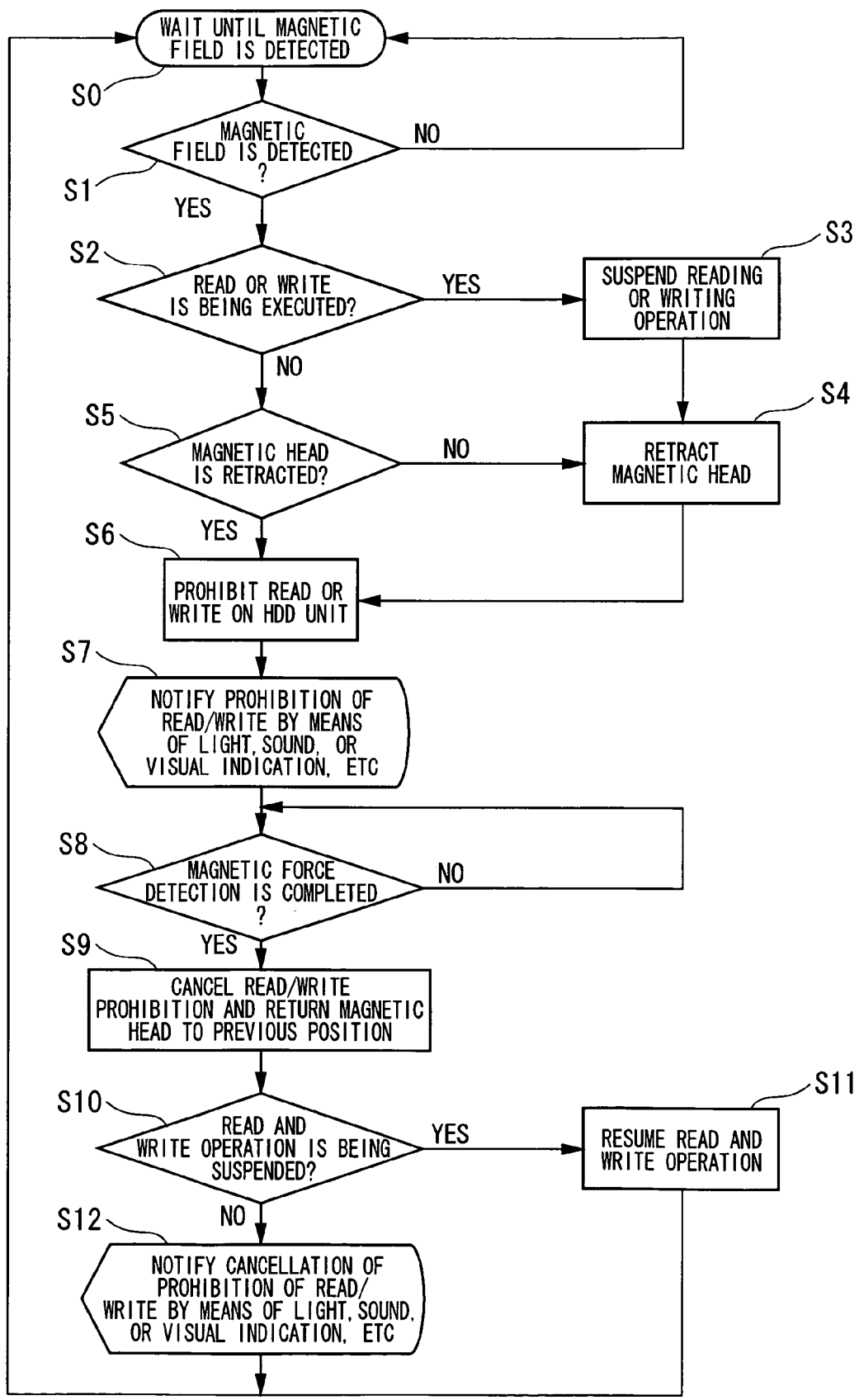
FIG. 6 is a flowchart of an operation when a magnetic force is detected by a magnetic detection unit.

The operation of the portable telephone 10 when data exchange between the non-contact type IC module 8 and the data transmission and reception unit 30 described above takes place is described with reference to a flowchart shown in FIG. 6.

The control unit 21 monitors detection of a magnetic force by the magnetic detection unit 31 (step S0), and determines whether or not a magnetic force is detected (step S1). When a magnetic force is detected by the magnetic detection unit 31, a determination is made as to whether or not a reading or writing operation is being executed on the HDD unit 6 (step S2).

When it is determined that a reading or writing operation is being executed, the writing or reading operation on the HDD unit 6 is halted (step S3). Thereafter, the magnetic head 28 is retracted from the magnetic disk 29 to a predetermined retract position (step S4), and the HDD unit 6 is prohibited from a writing or reading operation (step S6).

Furthermore, when it is determined that a reading or writing operation is not executed in step S2, a determination is made as to whether or not the magnetic head 28 is in the retract position (step S5). When it is determined that the magnetic head 28 is not in the retract position, the aforementioned steps S4 and S6 are executed. Furthermore, when it is determined that the magnetic head 28 is in the retract position in step S5, only step S6 is executed.

After step S6 is completed, a user is notified of suspension or prohibition of writing and reading operations on the HDD unit 6 by the notification unit 25 or the display unit 4 (step S7).

Following completion of step S7, a determination is made as to whether or not a magnetic force is being detected by the magnetic detection unit 31 (step S8), and step S8 is continued when a magnetic force is being detected by the magnetic detection unit 31. That is, the HDD unit 6 remains prohibited from a writing or reading operation until a magnetic force fails to be detected by the magnetic detection unit 31.

When a magnetic force fails to be detected by the magnetic detection unit 31 in step S8, the prohibition of writing and reading operations on the HDD unit 6 is cancelled, and the magnetic head 28 is moved from the retract position to its previous position (step S9). That is, the magnetic head 28 moves to a position where it was before step S4 was executed.

Following completion of step S9, a determination is made as to whether or not a writing or reading operation on the HDD unit 6 has been suspended in step S2 (step S10), and the suspended writing or reading operation is restarted when a writing or reading operation on the HDD unit 6 has been suspended (step S11). Furthermore, when a writing or reading operation on the HDD unit 6 has not been suspended in step S3, the user is notified of a cancellation of prohibition of writing and reading operations on the HDD unit 6 by the notification unit 25 or the display unit 4 (step S112).

After steps S11 and S12 are completed, the flow returns to step S0 in which detection of a magnetic force by the magnetic detection unit 31 is monitored.

As described above, in the portable telephone 10 according to the present invention, writing or reading of information on the HDD unit 6 is suspended or prohibited when a magnetic force is detected by the magnetic detection unit 31. Thus, even when a user presses the portable telephone 10 hard against the data transmission and reception unit 30 so that wireless communication between the non-contact type IC module 8 and the data transmission and reception unit 30 is reliably performed, any head crash or misoperation of the HDD unit 6 caused by the impact of the forced contact can be prevented. Furthermore, erroneous writing or reading of information caused by a magnetic force can be prevented.

Furthermore, since it is possible to notify the user of suspension or prohibition of writing and reading operations of information on the HDD unit 6 by the notification unit 25 or the display unit 4, the user can know the exact reason for the suspension or prohibition of writing and reading operation of information on the HDD unit 6. Thus, the user may not be confused by the operation of the portable telephone 10.

That is, for example, while the user is playing music that is recorded on the magnetic disk 29 of the portable telephone 10 using a music player function, the user is notified by the notification unit 25 or the display unit 4 that the music will be stopped in advance. The user can be assured that the stop operation of the music is not caused by a misoperation of the portable telephone 10.

Furthermore, when the magnetic detection unit 31 fails to detect a magnetic force, writing or reading of information onto or from the HDD unit 6 is automatically restarted. Thus, the user is not required to manually restart a writing or reading operation on the HDD unit 6 after the writing or reading is cancelled. Accordingly, the user can easily operate the portable telephone 10.

Next, a second embodiment of the present invention will be explained with reference to FIGS. 7 and 8. It should be noted that the operations or structures that are different from those of the first embodiment will be described, and the components that are similar to those in the portable telephone 10 will be referred to by the same reference numeral and a description thereof will be omitted. Furthermore, although a portable telephone (portable electronic apparatus) 34 is a single body 35 in the second embodiment, it may be constructed from two bodies, as in the first embodiment.

Figure 7:
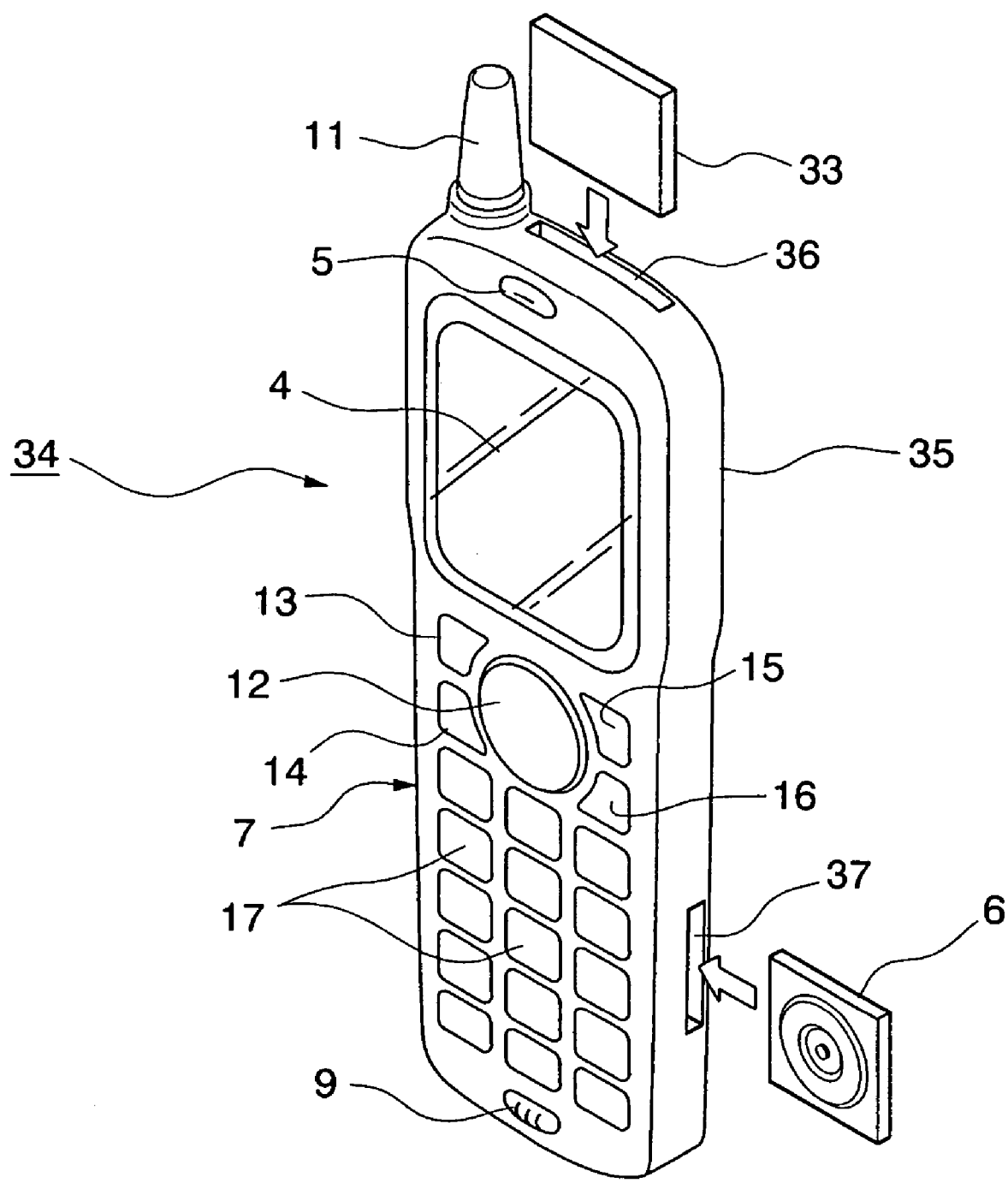
FIG. 7 is perspective view of a portable telephone according to a second embodiment of the present invention when viewed from the front side.
Figure 8:
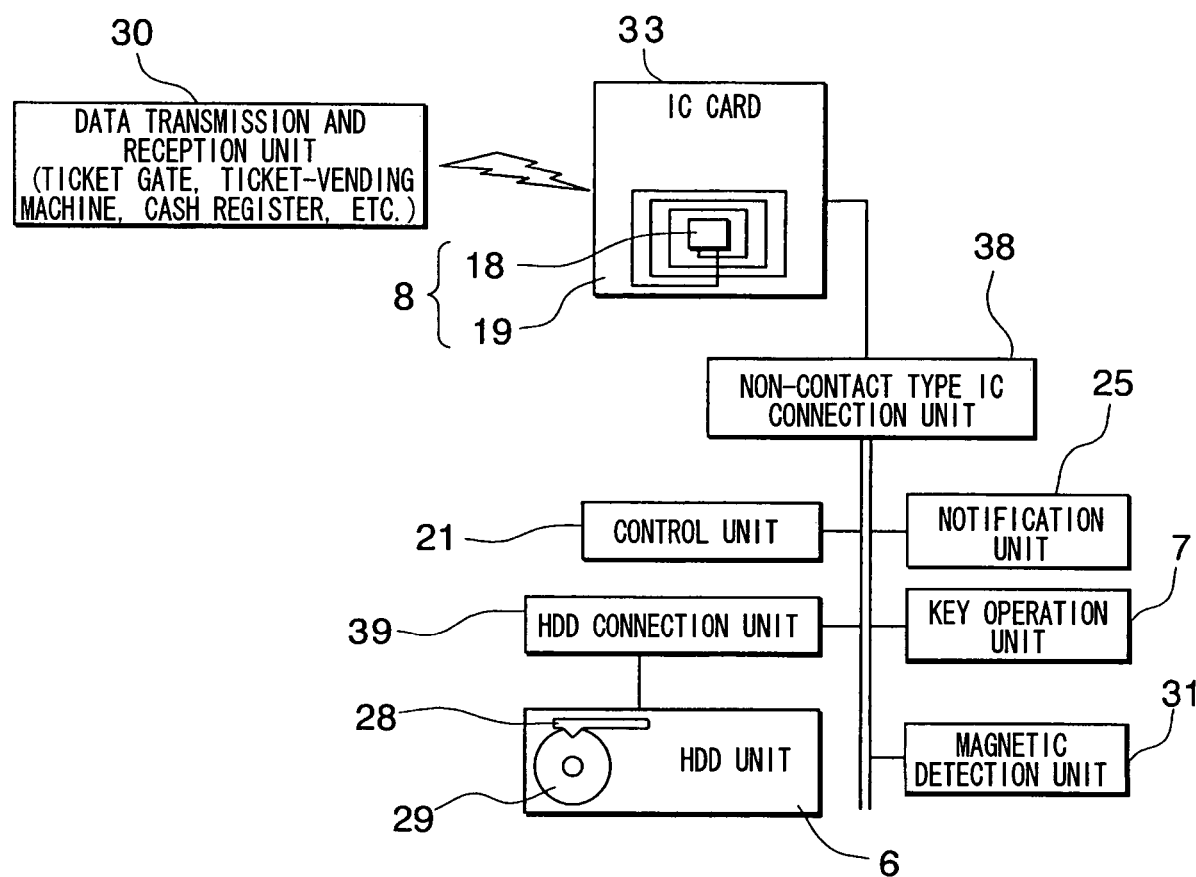
FIG. 8 is a block diagram illustrating the principal circuit configuration of a portable telephone terminal according to the second embodiment of the present invention.

In this embodiment, an IC card 33 including the non-contact type IC module 8 of the first embodiment is used, and this IC card 33 is detachably installed in a card slot 36 of the body 35, as shown in FIGS. 7 and 8. Furthermore, the HDD unit 6 is detachably installed in an HDD slot 37.

When the IC card 33 is installed in the card slot 36, a connecting unit (not shown) of the IC card 33 is connected to a non-contact type IC connection unit 38 that is provided in the card slot 36. In addition, when the HDD unit 6 is installed in the HDD slot 37, a connecting unit (not shown) of the HDD unit 6 is connected to an HDD connection unit 39 that is provided in the HDD slot 37.

In this portable telephone 34, the external IC card 33 and the external HDD unit 6 allow a reduction in the size and weight of the portable telephone 34. Furthermore, since a plurality of IC cards 33 and a plurality of HDD units 6 can be used in a single portable telephone 34, it is possible to enhance the usability for users while achieving the same advantageous effects as the first embodiment. It should be noted that one of the IC card 33 or the HDD unit 6 may be detachable, and the other one may be installed in the portable telephone 34.

It should be noted that although prohibition and its cancellation of a writing or reading operation on the HDD unit 6 are notified by the notification unit 25, the display unit 4, or the speaker unit 5 in the above-described first and second embodiments, the present invention is not limited to these particular embodiments. Such notification can be provided by any notification device that can provide a user with notification by means of at least one of light, sound, visual indication, and vibration, and the like. Therefore, for example, light emitting means, such as an LED or the like, may be provided on the body and the light emitting means may constitutes a notification device.

Furthermore, although it has been described that the magnetic head 28 is returned from the retract position to the previous position in step S9, the present invention is not limited to this example. For example, the magnetic head 28 may be returned from its retract position to the previous position in step S10.

Furthermore, a notification of a suspension or prohibition of writing and reading operations on the HDD unit 6 is provided by the notification unit 25 or the display unit 4 (step S7) after a reading or writing operation on the HDD unit 6 is prohibited (step S6). The present invention is not limited to this example, and notification is provided before step S3 or S4, for example.

Figure 9:
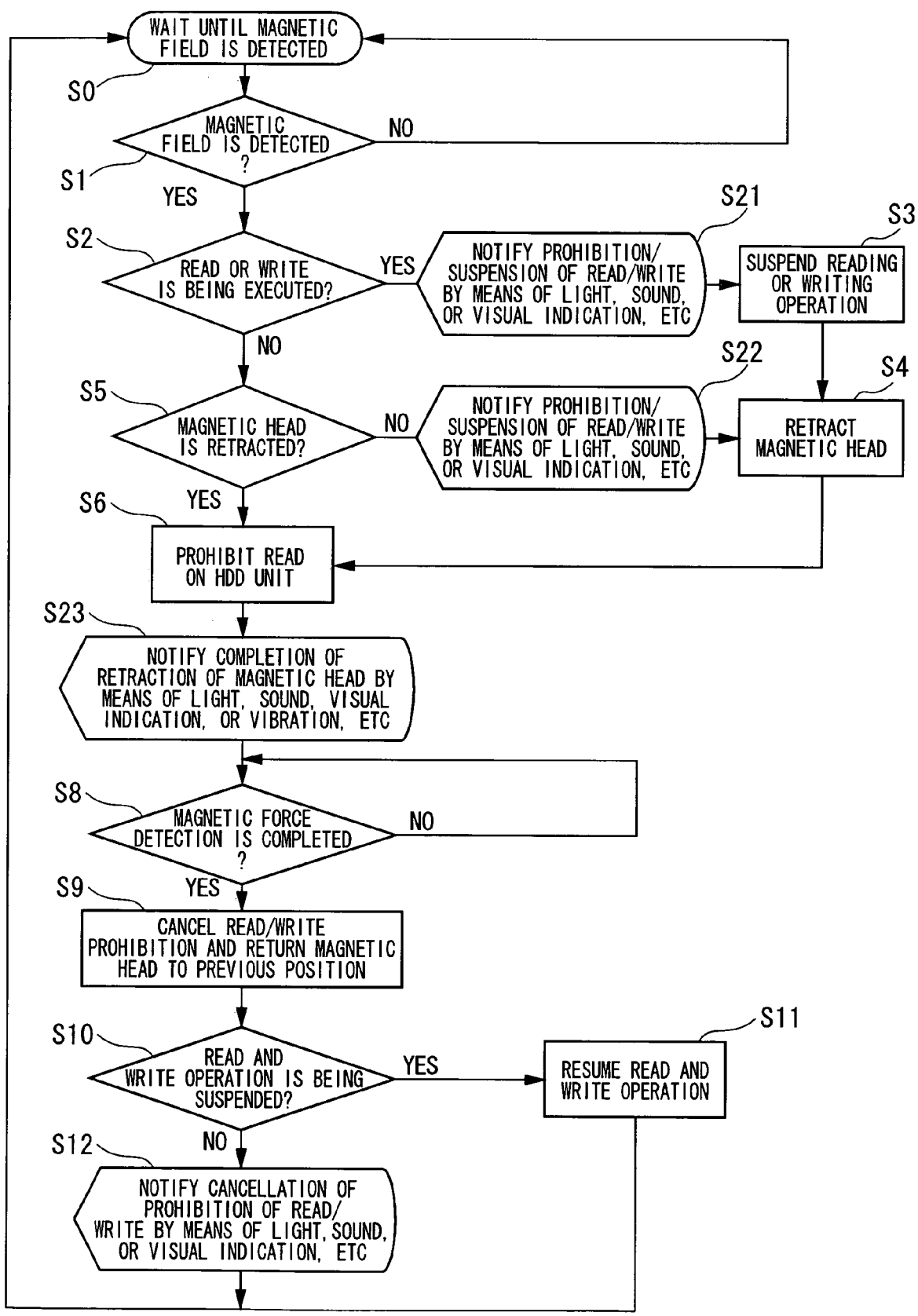
FIG. 9 is a flowchart of an operation when a magnetic force is detected by a magnetic detection unit in a portable telephone terminal according to another embodiment.

That is, in the above embodiments, when it is determined that the HDD unit 6 is being read or written on in step S2, or when it is determined that the magnetic head 28 is positioned above the magnetic disk 29 in step S5, suspension or prohibition of a reading or writing operation on the HDD unit 6 is notified by the notification unit 25 or the display unit 4 (steps S21 and S22), as shown in FIG. 9. However, a reading or writing operation on the HDD unit 6 may be suspended (step S3), or the magnetic head 28 may be retracted (step S4) after executing steps S21 and S22.

It should be noted that in this configuration, the user is preferably notified of the completion of a retract of the magnetic head 28 or the magnetic head 28 being in the retract position by the notification unit 25 or the display unit 4 (step S23) after step S6 is executed.

In the above-described configuration, it is possible to promptly alert the user not to press the portable telephone 10 or 34 hard against the data transmission and reception unit 30 even when the HDD unit 6 is operating. Accordingly, the content of the notification provided to the user in steps S21 and S22 may be a message of "HDD UNIT IS OPERATING," or "DO NOT BRING YOUR PORTABLE TELEPHONE CLOSE TO DATA TRANSMISSION AND RECEPTION UNIT," for example.

Furthermore, in the above configuration, since completion of retract of the magnetic head 28 is notified in step S23, the user can easily know when they can press the portable telephone 10 or 34 against the data transmission and reception unit 30.

Figure 10:
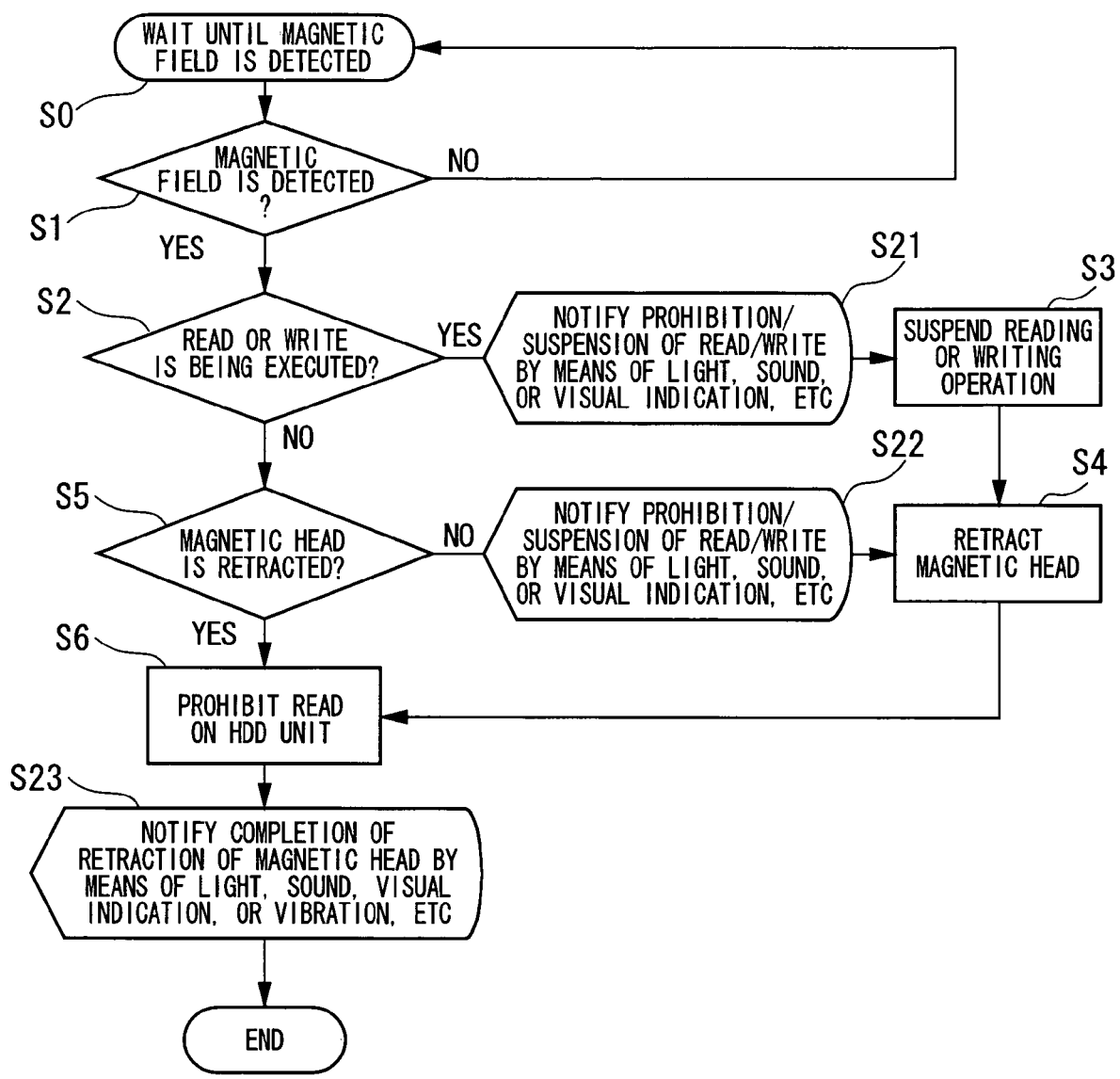
FIG. 10 is a flowchart of an operation when a magnetic force is detected by a magnetic detection unit in a portable telephone terminal according to another embodiment.

Furthermore, in the above embodiments, when it is determined that a magnetic force has failed to be detected in step S8, the HDD unit 6 is returned to the state in which an operation thereto can be started or restarted (step S9). The present invention is not limited to this example, and once a magnetic force is detected in step S1, the operation of the HDD unit 6 may be stopped while retaining the magnetic head 28 in the retract position, regardless of whether or not the magnetic force is still detected. That is, for example, as shown in FIG. 10, prohibition of reading and writing operations on the HDD unit 6 may be continued even when the magnetic detection unit 31 no longer detects a magnetic force after step S23 is completed.

In this configuration, since the read and write prohibition on the HDD unit 6 is sustained after completion of step S23, a head crash or misoperation of the HDD unit 6 can be reliably prevented when the portable telephone 10 or 34 is pressed against the data transmission and reception unit 30.

In particular, when a user notices a notification, e.g., the message of "HDD UNIT IS OPERATING" and removes the portable telephone 10 or 34 away from the data transmission and reception unit 30 in steps S21 and S22, that is, the detection of a magnetic force by the magnetic detection unit 31 is discontinued, no operations of the HDD unit 6 can be started without the user's intervention. Therefore, if the portable telephone 10 or 34 is pressed against the data transmission and reception unit 30 immediately after the message, a misoperation or the like of the HDD unit 6 can be prevented.

Figure 11:
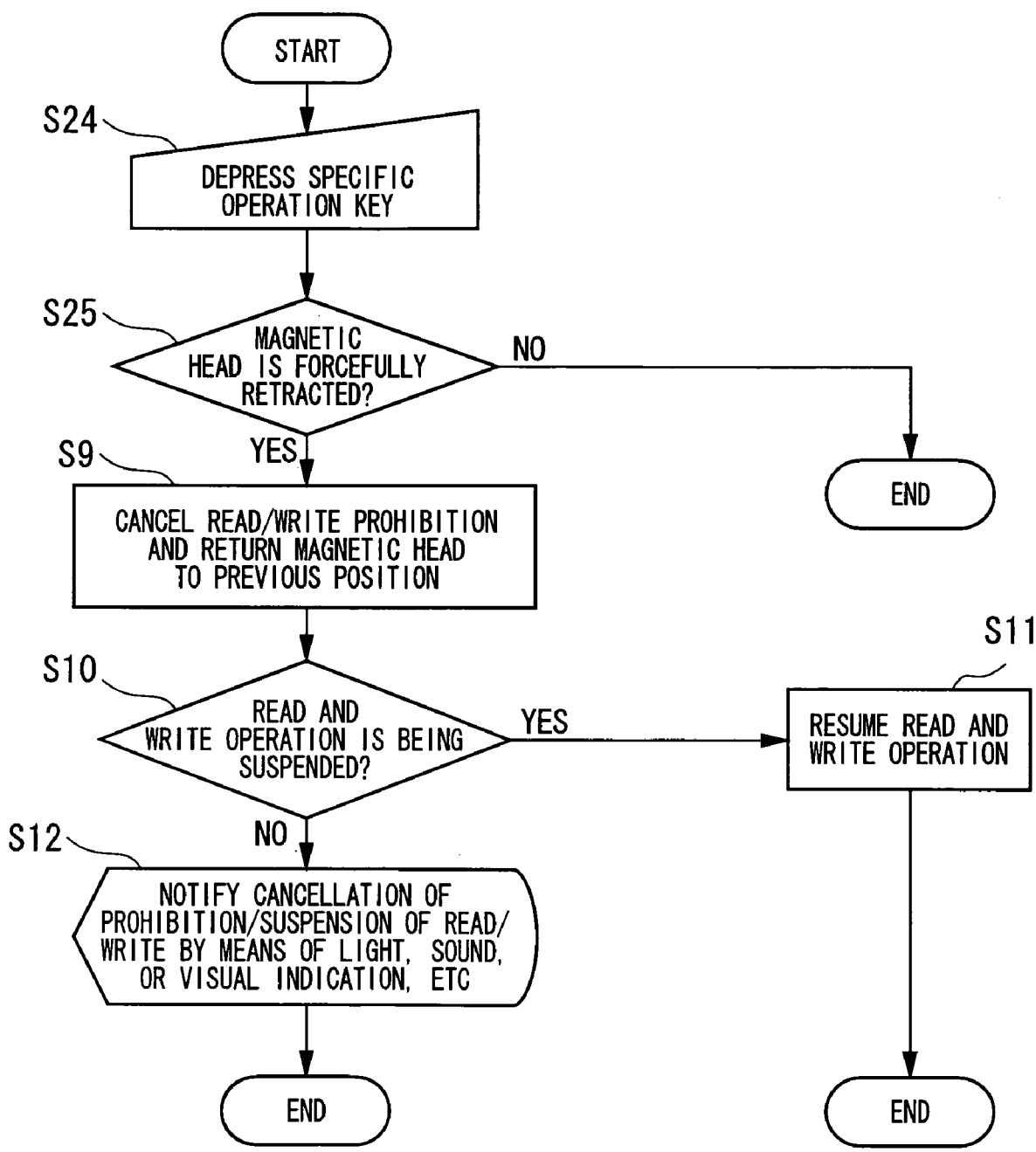
FIG. 11 is a flowchart of an operation to restart the operation of an HDD unit in a portable telephone according to another embodiment of the present invention.

It should be noted that after step S23 is completed, it is preferable that step S9 can be executed when the user depresses a predetermined specific operation key (step S24), as shown in FIG. 11, for example. The specific operation key may be a single operation key on the key operation unit 7, such as the multi-functional operation key 12 or the like, for example, and it functions as a switch to return the HDD unit 6 to an operable state.

Furthermore, it may be possible to add step S25 between steps S24 and S9, in which a determination is made as to whether or not the magnetic head 28 has been positioned above the magnetic disk 29 at the time when a magnetic force has been detected in step S1.

That is, if it has been determined in S25 that the magnetic head 28 was positioned above the magnetic disk 29 at the time of step S1, the operation executed by the control unit 21 for the HDD unit 6 is terminated. Otherwise, if it has been determined in S25 that the magnetic head 28 was not above the magnetic disk 29 at the time of step S1, the flow proceeds to step S9 and steps S10 to S12 are executed as in the example shown in FIG. 6.

In the above-described configuration, since the user can start or restart an operation on the HDD unit 6 by depressing a specific operation key, the user can operate the portable telephone 10 or 34 more easily.

Furthermore, the operation to prohibit writing or reading on the HDD unit 6 is not necessarily executed during data exchange between the non-contact type IC module 8 and the data transmission and reception unit 30, and it may be performed in response to at least the detection of a magnetic force by the magnetic detection unit 31.

Furthermore, although the portable telephone 10 in which two bodies 1 and 2 are foldably connected and the portable telephone 34 having one body have been described in the above two embodiments, the present invention can be applied to any portable electronic device other than portable telephones, provided that the devices include at least the HDD unit 6 and the non-contact type IC module 8. Examples include, for example, a PDA, a music player, and other portable electronic apparatuses.

Furthermore, the device with which the portable electronic device of the present invention interacts may not be limited to an automated ticket checking and fare adjustment gate, and the portable electronic device of the present invention can interact with any other devices having wireless communication capability, such as a cash register, a vending machine, or the like.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A portable electronic apparatus comprising:
   a non-contact type integrated circuit module;
   a magnetic recording device comprising:
     a magnetic recording medium; and
     a magnetic head that is adapted to be moved from a predetermined retract position to the magnetic recording medium for writing or reading of information;
   a magnetic detection unit that detects a magnetic force generated by a reader and a writer of an external device that engages in non-contact communication with the non-contact type integrated circuit module; and
   a control device that is adapted to make the magnetic head retract from the magnetic recording medium to the retract position when the magnetic head is positioned above the magnetic recording medium in response to the magnetic detection unit detecting the magnetic force.

2. The portable electronic apparatus according to claim 1, further comprising a notification device,
   wherein the control device is adapted to make the notification device provide notification in response to the magnetic detection unit detecting the magnetic force.

3. The portable electronic apparatus according to claim 1, further comprising a display unit,
   wherein the control device is adapted to make the display unit notify of a suspension or prohibition of the writing or reading of information by the magnetic recording device in response to the magnetic detection unit detecting the magnetic force.

4. The portable electronic apparatus according to claim 1, wherein, when the magnetic head is retracted by the control device during the writing or reading of information by the magnetic recording device and when the magnetic detection unit no longer detects the magnetic force, the control unit is adapted to restart the write or read of the information by the magnetic recording device.

5. The portable electronic apparatus according to claim 1, wherein the control device is adapted to prohibit the writing or reading of information by the magnetic recording device after the magnetic head is retracted to the retract position.

6. The portable electronic apparatus according to claim 5, further comprising an operation key that functions as a switch to restore the magnetic recording device to an operating state,
   wherein the control device is adapted to determine whether or not the magnetic head of the magnetic recording device is in the retract position in response to an operation of the operation key, and to cancel the prohibition of the writing or reading of information by the magnetic recording device when the magnetic head is in the retract position.

7. A portable electronic apparatus, comprising:
   a non-contact type integrated circuit module;
   a magnetic recording device comprising:
     a magnetic recording medium; and
     a magnetic head that is adapted to be moved from a predetermined retract position to the magnetic recording medium for writing or reading of information;
   a magnetic detection unit that detects a magnetic force generated by a reader and a writer of an external device that engages in non-contact communication with the non-contact type integrated circuit module; and a control device that is adapted to determine whether or not the magnetic head of the magnetic recording device is in the retract position in response to the magnetic detection unit detecting the magnetic force, and prohibit the writing or reading of information by the magnetic recording device when the magnetic head is in the retract position.

8. The portable electronic apparatus according to claim 7, wherein the control device is adapted to determine whether or not the magnetic head of the magnetic recording device is in the retract position in response to the magnetic detection unit detecting the magnetic force, retract the magnetic head of the magnetic recording device to the retract position when the magnetic head is not in the retract position, and prohibit the writing or reading of information by the magnetic recording device after the retraction of the magnetic head to the retract position completes.

9. The portable electronic apparatus according to claim 7, further comprising a notification device,
wherein the control device is adapted to make the notification device provide notification in response to the magnetic detection unit detecting the magnetic force.

10. The portable electronic apparatus according to claim 8, further comprising a notification device,
wherein the control device is adapted to make the notification device provide notification in response to the magnetic detection unit detecting the magnetic force.

11. The portable electronic apparatus according to claim 7, further comprising a display unit, wherein the control device is adapted to make the display unit notify of a prohibition of the writing or reading of information by the magnetic recording device in response to the magnetic detection unit detecting the magnetic force.

12. The portable electronic apparatus according to claim 8, further comprising a display unit,
wherein the control device is adapted to make the display unit notify of a prohibition of the writing or reading of information by the magnetic recording device in response to the magnetic detection unit detecting the magnetic force.

13. The portable electronic apparatus according to claim 7, further comprising an operation key that functions as a switch to restore the magnetic recording device to an operating state,
wherein the control device is adapted to determine whether or not the magnetic head of the magnetic recording device is in the retract position in response to depression of the operation key, and cancel the prohibition of the writing or reading of information by the magnetic recording device when the magnetic head is in the retract position.

14. The portable electronic apparatus according to claim 8, further comprising an operation key that functions as a switch to restore the magnetic recording device to an operating state,
wherein the control device is adapted to determine whether or not the magnetic head of the magnetic recording device is in the retract position in response to depression of the operation key, and cancel the prohibition of the writing or reading of information by the magnetic recording device when the magnetic head is in the retract position.

* * * * *